US005671130A

United States Patent [19]
Kerkman et al.

[11] Patent Number: 5,671,130
[45] Date of Patent: Sep. 23, 1997

[54] METHOD AND APPARATUS FOR CONTROLLING VOLTAGE REFLECTIONS USING A MOTOR CONTROLLER

[75] Inventors: Russel J. Kerkman, Milwaukee; David Leggate, New Berlin; Gary L. Skibinski, Milwaukee, all of Wis.

[73] Assignee: Allen-Bradley Company, Inc., Milwaukee, Wis.

[21] Appl. No.: 701,950

[22] Filed: Aug. 23, 1996

[51] Int. Cl.[6] .................................. H02M 1/12; H02P 5/28
[52] U.S. Cl. ............................ 363/41; 363/132; 318/811
[58] Field of Search .............................. 363/41, 56, 131, 363/132; 318/806, 811

[56] References Cited

U.S. PATENT DOCUMENTS

| | | | |
|---|---|---|---|
| 3,800,198 | 3/1974 | Graf et al. | 318/806 |
| 4,330,817 | 5/1982 | Avar et al. | 363/138 |
| 4,763,347 | 8/1988 | Erdman | 318/254 |
| 4,833,586 | 5/1989 | Inaba et al. | 363/41 |
| 5,519,301 | 5/1996 | Yoshida et al. | 318/811 |
| 5,592,355 | 1/1997 | Ikkai et al. | 361/94 |
| 5,610,806 | 3/1997 | Blasko et al. | 363/41 |

Primary Examiner—Stuart N. Hecker
Attorney, Agent, or Firm—Michael A. Jaskolski; John M. Miller; John J. Horn

[57] ABSTRACT

A method and apparatus for eliminating greater than twice over voltage by altering firing signals provided to a PWM inverter. The signals are altered by either limiting their maximum and minimum on-times or eliminating signal changes in a symmetrical fashion so that the overall fundamental component and magnitude of a resulting low frequency alternating voltage is substantially unaltered.

22 Claims, 10 Drawing Sheets

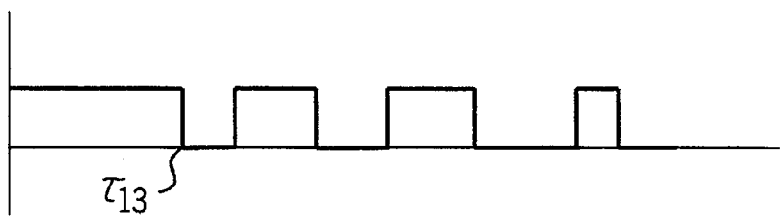
FIG. 6(a) $U_X$
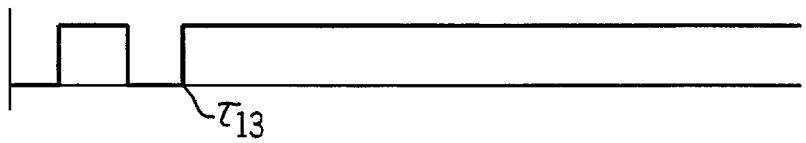
FIG. 6(b) $U_Y$
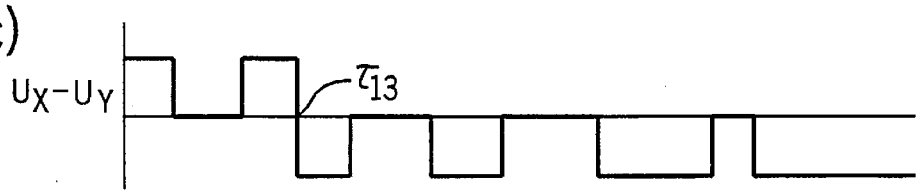
FIG. 6(c) $U_X - U_Y$
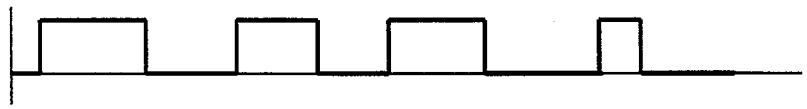
FIG. 6(d) $U'_X$
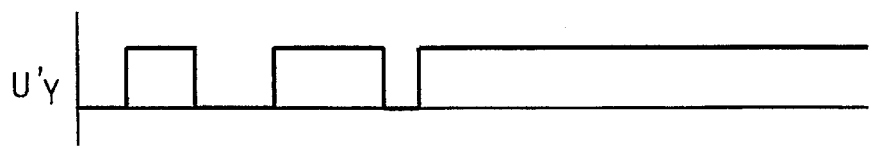
FIG. 6(e) $U'_Y$
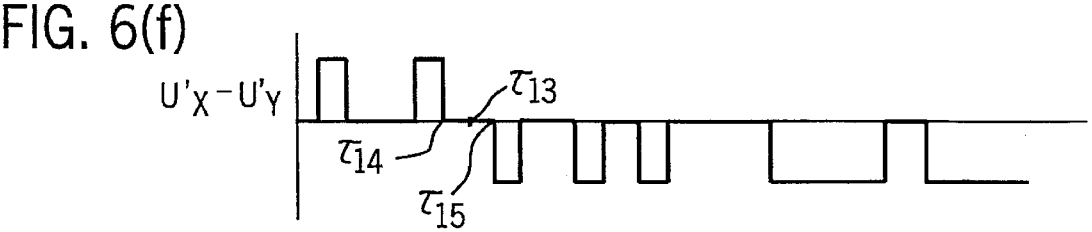
FIG. 6(f) $U'_X - U'_Y$

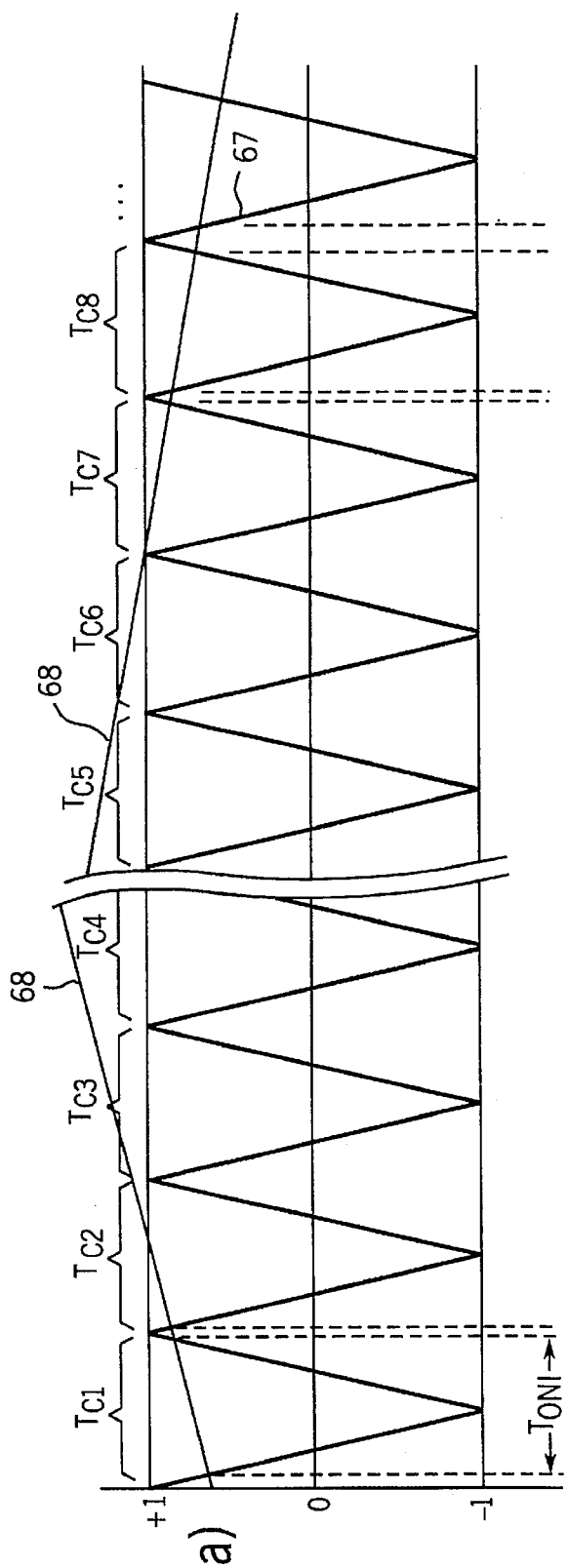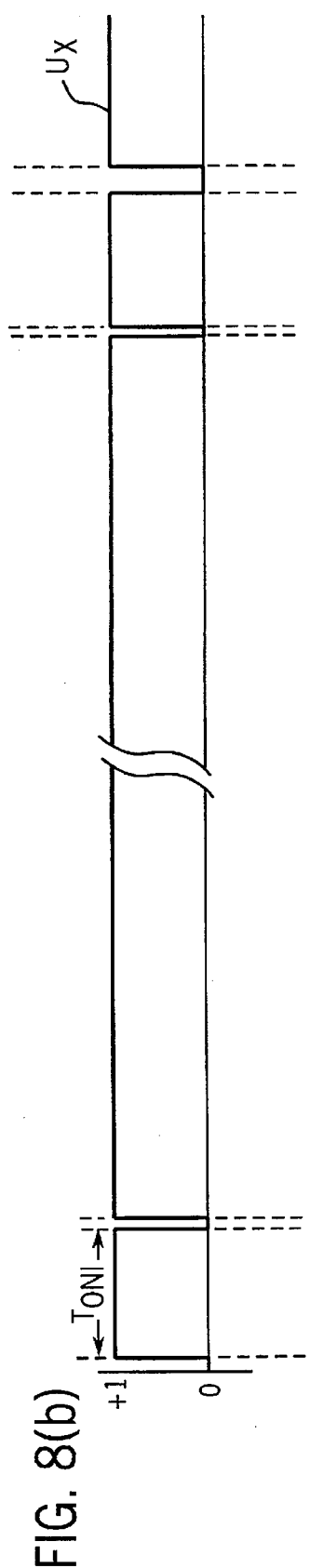
FIG. 8(a)
FIG. 8(b)

METHOD AND APPARATUS FOR CONTROLLING VOLTAGE REFLECTIONS USING A MOTOR CONTROLLER

FIELD OF THE INVENTION

The present invention relates to motor controllers and more particularly, to a method and an apparatus for altering stator winding voltages to eliminate greater than twice over voltage.

DESCRIPTION OF THE ART

Many motor applications require that a motor be driven at various speeds. Motor speed can be adjusted with an adjustable speed drive (ASD) which is placed between a voltage source and an associated motor that can excite the motor at various frequencies. One commonly used type of ASD uses a three-phase pulse width modulated (PWM) inverter and associated PWM controller which can control both voltage and frequency of signals that eventually reach motor stator windings.

A three-phase PWM controller receives three reference signals and a triangle carrier signal, compares each reference signal to the carrier signal and generates firing signals consisting of a plurality of pulses corresponding to each reference signal. When a reference signal has a greater instantaneous amplitude than the carrier signal, a corresponding firing signal is high producing a pulse on-time. When a reference signal has an instantaneous amplitude that is less than the carrier signal, a corresponding firing signal is low producing a pulse off-time.

The firing signals are used to control an associated PWM inverter. A three-phase PWM inverter consists of three pairs of switches, each switch pair including series arranged upper and lower switches configured between positive and negative DC power supplies. Each pair of switches is linked to a unique motor terminal by a unique supply line, each supply line connected to a node between an associated pair of switches. Each firing signal controls an associated switch pair to alternately connect a stator winding between the positive and negative DC power supplies to produce a series of high frequency voltage pulses that resemble the firing signals. A changing average of the high frequency voltage pulses over a period defines a fundamental low frequency alternating line-to-line voltage between motor terminals that drives the motor.

Insulated Gate Bipolar Transistors, IGBTs have fast rise times and associated switching speeds (e.g. 50–400 ns) that are at least an order of magnitude faster than BJTs and other similar devices. At IGBT switching speeds, switching frequency and efficiency, and the quality of terminal voltages, are all appreciably improved. In addition, the faster switching speeds reduce generated heat and audible motor lamination noise.

While IGBT PWMs are advantageous for all of the reasons identified above, when combined with certain switch modulating techniques (i.e. certain on/off switching sequences), IGBT fast dv/dt or rise times can reduce the useful life of motor components and/or voltage supply lines. In particular, while most motors and supply lines are designed to withstand operation at rated line voltages for long periods and to withstand predictable overvoltage levels for short periods, in many cases, fast switch rise times cause overvoltages that exceed predicted levels.

For a long time the industry has recognized and configured control systems to deal with twice overvoltage (i.e. twice the DC power supply level) problems. As well known in the controls art, twice overvoltage levels are caused by various combinations of line voltage rise time and magnitude, imperfectly matched line-to-line motor surge impedances, and supply line length. Line voltage frequency and switch modulating techniques have little effect on twice overvoltage levels.

One common way to cope with twice overvoltage levels has been to reduce reflected voltage by terminating supply lines with filter networks that change the slope of voltage pulses (i.e. the turn-on times) as they arrive at motor terminals. In addition, to reduce the possibility of damage from periodic twice overvoltage levels, most supply lines and motors are insulated to withstand periodic twice overvoltage levels. Thus, the industry has developed different system configurations for dealing with twice overvoltage.

Unfortunately, there is another potentially more damaging overvoltage problem that has not been satisfactorily dealt with. The second overvoltage problem is referred to herein as greater than twice overvoltage. Greater than twice overvoltage, unlike twice overvoltage, is effected only minimally by line voltage rise time and therefore, conventional filter networks do not appreciably reduce greater than twice overvoltage. Unlike twice overvoltage, greater than twice overvoltage is caused by fast switching rise times and fast dv/dt associated with IGBTs and by two different common switch modulating techniques that result in double pulsing and polarity reversal.

Referring to FIG. 1, double pulsing will be described in the context of an IGBT inverter generated voltage $V_i$ and a resulting motor terminal voltage $V_m$. Initially, at time $\tau 1$, the line is shown in a fully-charged condition ($V_i(\tau_1)=V_{DC}$). A transient disturbance occurs by discharging the line at $\tau_2$ for approximately 4 μsec. The propagation delay between the inverter terminals and motor terminals is fully recognizable and is approximately 1 μsec. At time $\tau_3$, 1 μsec after time $\tau_2$, a negative $V_{DC}$ voltage reaches the motor terminals. In this example, a motor terminal reflection coefficient $\Gamma_m$ is nearly unity. Thus, the motor reflects the incoming negative voltage and forces the terminal voltage $V_m$ to approximately negative bus voltage:

$$V_m(\tau_3)=V_m(\tau_1)-V_{DC}(1+\Gamma_m) \approx -V_{DC} \qquad \text{Eq. 1}$$

A reflected wave ($-V_{DC}$) travels from the motor to the inverter in 1 μsec and is immediately reflected back toward the motor, Where an inverter reflection coefficient $\Gamma_i$ is approximately negative unity, a positive $V_{DC}$ pulse is reflected back toward the motor at time $t_4$. Therefore, at time $t_4$ the discharge at time $\tau_2$ alone causes a voltage at the motor terminal such that:

$$V_m(\tau_4)=V_m(\tau_1)-V_{DC}(1+\Gamma_m)-V_{DC}\Gamma_i\Gamma_m(1\Gamma_m) \approx V_{DC} \qquad \text{Eq. 2}$$

In addition, at time $\tau_4$, with the motor potential approaching $V_{DC}$ due to the $\tau_2$ discharge, the inverter pulse $V_i(t_4)$ arrives and itself recharges the motor terminal voltage to $V_{DC}$. Pulse $V_i(t_4)$ is reflected by the motor and combines with $V_m(t_4)$ to achieve a peak value of approximately three times the DC rail value:

$$V_m(\tau_4+)=V_m(\tau_1)-V_{DC}(1+\Gamma_m)-V_{DC}\Gamma_i\Gamma_m(1+\Gamma_m)+V_i(\tau_4)(1+\Gamma_m) \approx 3 V_{DC} \qquad \text{Eq. 3}$$

Referring to FIG. 2 polarity reversal will be described in the context of an IGBT inverter generated line-to-line voltage $V_{i1}$ and a resulting motor line-to-line voltage $V_{m1}$. Polarity reversal occurs when the firing signal of one supply line is transitioning into overmodulation while the firing signal of another supply line is simultaneously transitioning out of overmodulation. Overmodulation occurs when a reference signal magnitude is greater than the maximum carrier signal magnitude so that the on-time or off-time of a switch is equal to the duration of the carrier period. Polarity reversal is common in all types of PWM inverter control.

Initially, the inverter line-to-line voltage $V_{i1}(\tau_5)$ is zero volts. At time $\tau_6$, the inverter voltage $V_{i1}(\tau_6)$ is increased to $V_{DC}$ and, after a short propagation period, a $V_{DC}$ pulse is received and reflected at the motor terminals thus generating a 2 $V_{DC}$ pulse across associated motor lines. At time $\tau_7$, the line-to-line voltage switches polarity (hence the term polarity reversal) so that the inverter voltage $V_{i1}(\tau_7)$ is equal to $-V_{DC}$ when the line-to-line motor voltage $V_{m1}(\tau_7)$ is still 2 $V_{DC}$. After a short propagation period, the $-V_{DC}$ inverter voltage reaches the motor, reflects, and combines with the positive 2 $V_{DC}$ voltage to generate an approximately $-3 V_{DC}$ line-to-line motor voltage $V_{m1}(\tau_8)$ at time $\tau_8$.

In reality, the amplitude of overvoltages will often be less than described above due to a number of system variables including line damping characteristics, DC power supply level, pulse dwell time, carrier frequency $f_c$, modulation techniques, and less than unity reflection coefficients.

One solution to the double pulsing problem has been to limit the switching speed to a maximum rate. In other words, referring again to FIG. 1, the discharge time between pulses would be extended from the present 4 μsecs so that, prior to the second pulse $V_i(\tau_4)$ reaching the motor terminals, the motor terminal voltage Vm would reach a substantially steady state zero value.

While this solution eliminates greater than twice overvoltage due to double pulsing, this solution can disadvantageously reduce the amplitude of the resulting fundamental low frequency terminal voltage where overmodulation occurs. For example, referring to FIG. 3, a series of high frequency voltage pulses 5 at a motor terminal and a resulting fundamental low frequency terminal voltage 6 can be observed. In FIG. 3, a positive phase of the low frequency voltage begins at τ9 and ends at τ10.

To eliminate greater than twice overvoltage, typical pulse limiting schemes would simply increase the duration of each off-time period that is less than a minimum allowable off-time. In FIG. 3, the off-times of pulses during the overmodulation periods (i.e. ζ1–ζ4) are equal to associated carrier periods and therefore are greater than the maximum on-time and would thus all be limited. Where the magnitude of the DC power supply is reduced substantially, the number of overmodulation earlier periods having limited on-times increases proportionally until, at some point, the reduced on-time noticeably affects the low frequency terminal voltage magnitude. In other words, maximum power output is substantially reduced through blind limitation of firing pulses during overmodulation.

While FIG. 3 is only exemplary, it can be seen that during the positive phase (i.e. τ9–τ10), the four firing pulses that would normally occur during carrier periods ζ1–ζ4 would all be limited to a maximum on-time according to prior art methods of reducing greater than twice overvoltage. In many cases, especially where the DC supply magnitude is minimal or reduced, the reduction in low frequency terminal voltage is unacceptable.

In addition to reducing the magnitude of the fundamental low frequency voltage 6, prior solutions do not address the polarity reversal problem. In fact, perhaps because the polarity reversal problem is not widely recognized, there is no known method or apparatus for dealing with polarity reversal greater than twice overvoltage.

Therefore, it would be advantageous to have a method and apparatus that could eliminate greater than twice overvoltage without distorting the fundamental components of motor terminal voltages.

SUMMARY OF THE INVENTION

The present invention modifies firing pulses that are provided to an inverter in a manner calculated to eliminate greater than twice overvoltage switching sequences. Where the period between two voltage changes is less than the period required for a substantially steady state voltage to be reached, the period between the two changes is increased. Where overmodulation switching sequences result in greater than twice overvoltage due to polarity reversal, the overmodulation switching sequence is altered to eliminate the possibility of greater than twice overvoltage.

The inventive method is to be used with a motor controller generating firing pulses to control an inverter wherein the inverter provides exciting voltage to a motor corresponding to the firing pulses. The voltage has a characteristic maximum intended amplitude. The method substantially eliminates exciting voltage greater than twice the maximum intended amplitude by modifying the firing pulses to provide modified firing pulses. The method includes the steps of identifying firing pulse characteristics, comparing the firing pulse characteristics to an overvoltage characteristic set known to cause greater than twice overvoltage, where the firing pulse characteristics match the overvoltage characteristic set, generating a modified firing pulse having modified characteristics that do not cause greater than twice overvoltage and modifying subsequent firing pulses to compensate for the effect of the modified firing pulse.

One object of the invention is to eliminate greater than twice overvoltage. By determining which firing pulses will generate greater than twice overvoltage and modifying those pulses, greater than twice overvoltage can be eliminated.

The method is to be used with a controller that includes a comparator that compares a reference signal to a carrier signal to provide the initial firing pulses, one firing pulse provided during each carrier period, each firing pulse characterized by an on-time having a duration that is between zero and the length of the carrier period. Firing pulses are said to be in overmodulation when their on-times are either zero or the length of the carrier period. The overvoltage characteristics include a maximum and a minimum on-time. The reference signal has alternating positive and negative phases. The step of generating includes, during positive phases of the reference signal, limiting the on-times of the firing pulses during the first N carrier periods of overmodulation to the maximum on-time and, during negative phases of the reference signal, limiting the on-times of the firing pulses during the first N carrier periods of overmodulation to the minimum on-time where N is a maximum first count.

Where overmodulation occurs, the step of identifying also includes identifying the last N carrier periods of an overmodulation period and, the step of modifying other signals includes the steps of limiting the firing pulses during the last N carrier periods of the overmodulation period to the maximum on-time when the reference signal is in the positive phase and to the minimum on-time when the reference signal is in the negative phase.

Thus, another object of the invention is to eliminate greater than twice overvoltage due to polarity reversal yet maintain a relatively high terminal voltage magnitude. By limiting the number of firing pulses that are altered that are typically in overmodulation, the overall magnitude reducing effect of altering the firing pulses is reduced.

Yet another object is to maintain the fundamental component of the terminal voltage while altering the firing pulses to eliminate greater than twice overvoltage. The period of the fundamental component of the terminal voltage can be tracked and symmetrically altered to maintain the fundamental component. In overmodulation, the firing pulses can be altered at the beginning and at the end of the overmodulating period in an identical manner.

The step of identifying preferably includes the step of determining the on-times of each firing pulse that does not occur during an overmodulation period. In addition, the step of comparing includes the step of comparing each of the firing pulse on-times to the maximum and minimum on-times.

In one embodiment, where the reference signal phase is positive, the step of generating includes the step of limiting a number of firing pulse on-times during carrier periods immediately preceding an overmodulation period and limiting a number of firing pulse on-times during carrier periods immediately following an overmodulation period to the maximum on-time. Similarly, where the reference signal phase is negative, the step of generating includes the step of limiting a number of firing pulse on-tines during carrier periods immediately preceding an overmodulation period and limiting a number of firing pulse on-times during carrier periods immediately following an overmodulation period to the minimum on-time.

In another embodiment, where the reference signal phase is positive, the step of generating includes the step of increasing some of the firing pulse on-times during carrier periods immediately preceding and immediately following an overmodulation period to the carrier period duration. Similarly, where the reference signal phase is negative, the step of generating includes the step of eliminating some of the firing pulse on-times during carrier periods immediately preceding and following an overmodulation period so that the on-times have zero duration.

Thus, one other object of the invention is to maintain a desired output voltage despite altered firing pulses. By reducing the on-times of some firing pulses during reference signal positive phases to the maximum on-time and increasing others to the carrier period, and by increasing the on-times of some firing pulses during reference signal negative phases to the minimum on-time and decreasing others to zero duration, the average on-times during a reference signal half-cycle will be approximately the average produced by the original firing signals and the output voltage reduction will be minimized.

The invention also includes an apparatus to be used in accordance with the inventive method. The apparatus is to be used with the same type of motor controller described above and includes means for identifying firing pulse characteristics, means for comparing the firing pulse characteristics to an overvoltage characteristic set known to cause greater than twice overvoltage, where the firing pulse characteristics match the overvoltage characteristic set, means for generating a modified firing pulse having modified characteristics that do not cause greater than twice overvoltage, and means for modifying subsequent firing pulses to compensate for the effect of the modified firing pulse.

The means for generating preferably includes, during positive phases of the reference signal, means for limiting the on-times of the firing pulses during the first N carrier periods of overmodulation to the maximum on-time and, during negative phases of the reference signal, means for limiting the on-times of the firing pulses during the first N carrier periods of overmodulation to the minimum on-time.

The means for identifying includes, where overmodulation occurs, means for identifying the last N carrier periods of an overmodulation period and, the means for modifying other signals includes means for limiting the firing pulses during the last N carrier periods of the overmodulation period to the maximum on-time when the reference signal is in the positive phase and to the minimum on-time when the reference signal is in the negative phase.

The means for identifying firing pulse characteristics also includes means for determining the on-times of each firing pulse that does not occur during an overmodulation period, the means for comparing includes means for comparing each of the firing pulse on-times to the maximum and minimum on-times.

In one embodiment, when the reference signal phase is positive, the means for generating includes means for limiting a number of firing pulse on-times during carrier periods immediately preceding an overmodulation period and limiting a number of firing pulse on-times during carrier periods immediately following an overmodulation period to the maximum on-time. Similarly, where the reference signal phase is negative, the means for generating includes means for limiting a number of firing pulse on-times during carrier periods immediately preceding an overmodulation period and for limiting a number of firing pulse on-times during carrier periods immediately following an overmodulation period to the minimum on-time.

In another embodiment, when the reference signal phase is positive, the means for generating includes means for increasing some of the firing pulse on-times during carrier periods immediately preceding and following an overmodulation period to the carrier period duration. Similarly, where the reference signal phase is negative, the means for generating includes means for eliminating some of the firing pulse on-times during carrier periods immediately preceding and following an overmodulation period so that the on-times have zero duration.

Other and further aspects of the present invention will become apparent during the course of the following description and by reference to the accompanying drawings.

BRIEF DESCRIPTION OF THE DRAWINGS

FIGS. 6(a) and 6(b) are graphs illustrating firing pulses for two different motor phases; FIG. 6(c) is a graph illustrating the line-to-line voltage resulting from the firing pulses shown in FIG. 6(a) and 6(b); FIGS. 6(d) and 6(e) are similar to FIGS. 6(a) and 6(b); FIG. 6(f) is a graph illustrating the lint-to-line voltage resulting from the firing pulses shown in FIGS. 6(d) and 6(e);

FIG. 8(a) is a graph illustrating signals used to produce firing pulses; FIG. 8(b) is a graph illustrating uncompensated PWM firing pulses produced by comparing the signals of FIG. 8(a)

DETAILED DESCRIPTION OF THE PREFERRED EMBODIMENT

Figure 1:
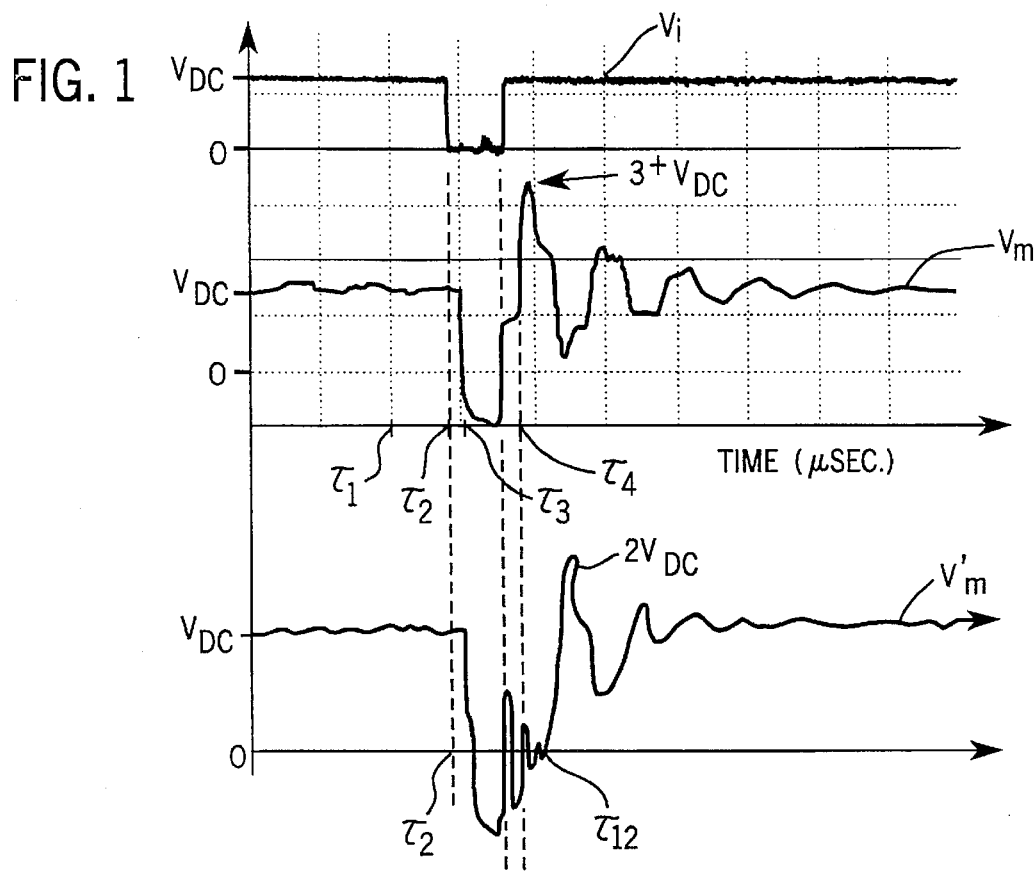
FIG. 1 is a graph illustrating an inverter generated firing signal, a resulting uncompensated line-to-line motor voltage and a compensated line-to-line motor voltage.

The present invention will be described in the context of the exemplary PWM inverter 9 shown in FIG. 4. The inverter 9 is shown connected to a delay module 11, a DC voltage source 18, and a motor 19. The inverter consists of six solid state switching devices 12–17 (BJT, GTO, IGBT or other transistor technology devices may be used) arranged in series pairs, each switching device 12–17 being coupled with an inverse parallel connected diode 23–28.

Each series arranged pair of switching devices 12 and 13, 14 and 15, and 16 and 17, make up a separate leg 39, 40 or 41 of the inverter 9 and have a common node which is electrically connected to a unique motor terminal 30, 31, or 32 (and thus to a unique stator winding 35, 36 or 37). Each switching device 12–17 is also electrically connected by a firing line 51–56 to the delay module 11 and through the delay module to an overvoltage compensator 7 and a signal generator 20. A split DC voltage source 18 creates a high voltage rail 48 and a low voltage rail 49 and each leg 39, 40, 41 connects the high voltage rail 48 to the low voltage rail 49.

To avoid repetitive disclosure, the PWM inverter 9 will be explained by referring only to leg 39 as all three legs 39, 40, and 41 of the inverter operate in the same manner.

The signal generator 20, overvoltage compensator 7 and delay module 11 operate together to turn the switching devices 12, 13 of leg 39 on and off in a repetitive sequence that alternately connects the high and low voltage rails 48, 49 to, and produces a series of high frequency voltage pulses at, terminal 31.

Figure 5A:
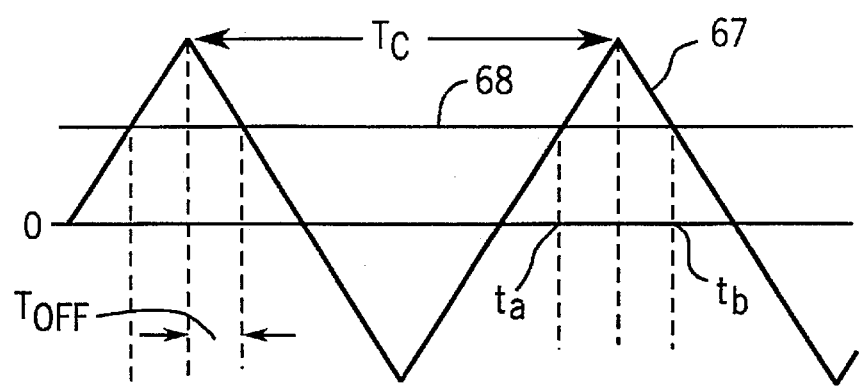
FIG. 5(a) is a graph illustrating the signals used by a PWM inverter to produce high frequency voltage pulses.

Referring now to FIG. 5(a), signals used by the signal generator 20 to generate the firing pulses for leg 39 may be observed. As well known in the art, a carrier signal 67 is perfectly periodic and operates at what is known as the carrier frequency. A reference signal 68 has a much greater period than the carrier signal 67.

Figure 5B:
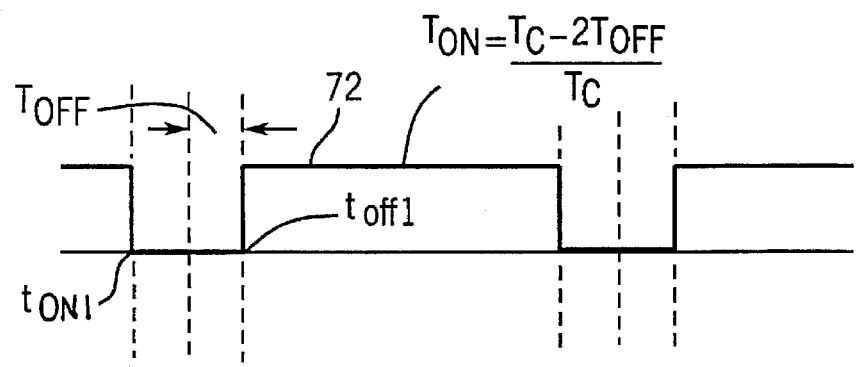
FIGS. 5(b) and 5(c) are graphs illustrating PWM firing pulses generated by comparison of the signals of FIG. 5(a)
Figure 5C:
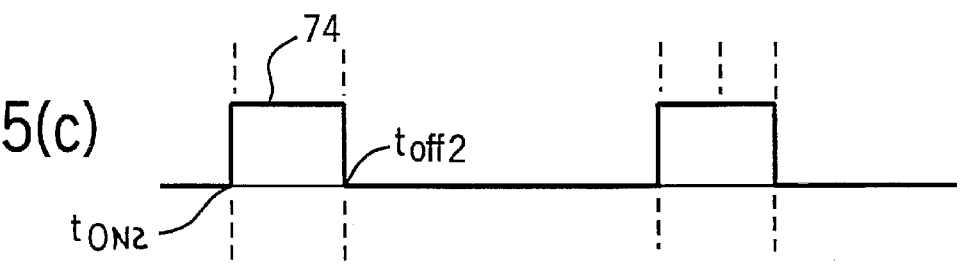

Referring also to FIGS. 5(b) and 5(c) an upper signal 72 and a lower signal 74 that control the upper and lower switches 12, 13, respectively, can be observed. The turn-on ton1, ton2 and turn-off toff1, toff2 times of the upper and lower signals 72, 74 come from the intersections of the reference signal 68 and the carrier signal 67.

When the reference signal 68 intersects the carrier signal 67 while the carrier signal has a positive slope, the upper signal 72 goes off and the lower signal 74 goes on. On the other hand, when the reference signal 68 intersects the carrier signal 67 while the carrier signal has a negative slope, the upper signal 72 goes on and the lower signal 74 goes off.

Thus, by comparing the carrier signal 67 to the reference signal 68, the state of the upper and lower signals 72, 74 can be determined. Preferably, only the upper signal 72 is provided to the overvoltage compensator 7.

Figure 4:
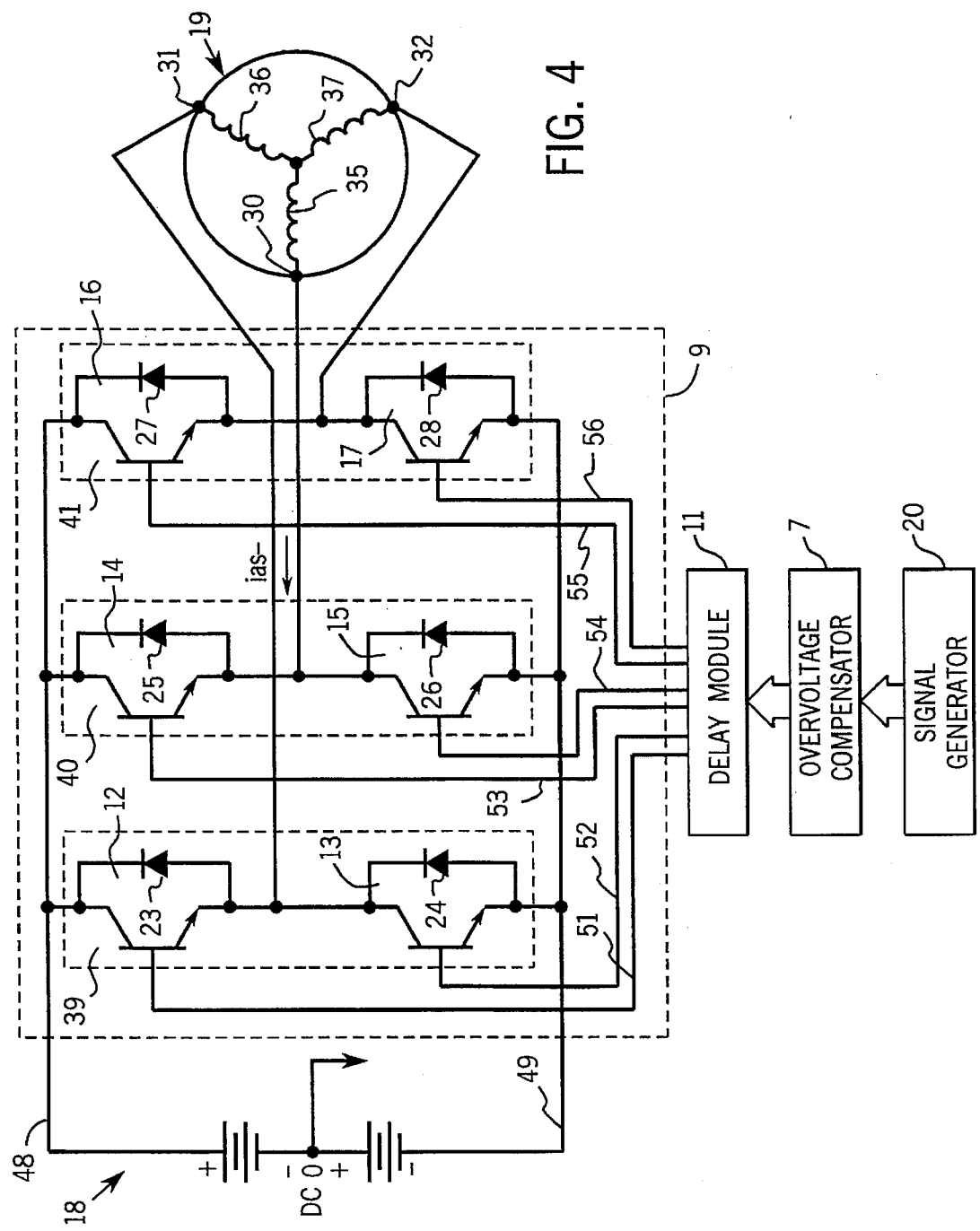
FIG. 4 is a schematic of the motor controller for generating the compensated voltages of FIGS. 1 and 2.
Figure 5D:
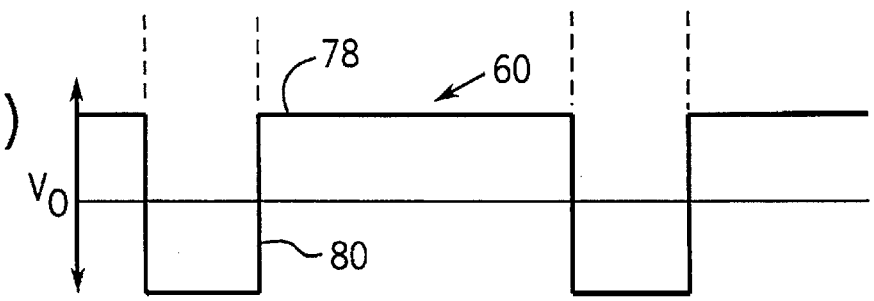
FIG. 5(d) is a graph illustrating a high frequency pulse generated by the firing pulses of FIGS. 5(b) and 5(c)

Referring to FIGS. 4 and 5(d), a high frequency voltage pulse 60 resulting from the upper and lower signals 72, 74 in FIGS. 5(b) and 5(c) that might be provided at terminal 31 can be observed. When the upper signal 72 is on and the lower signal 74 is off, switching device 12 allows current to flow from the high voltage rail 48 to motor terminal 31 thus producing the positive phase 78 of pulse 60 at motor terminal 31. Ideally, the upper signal 72 goes off and the lower signal 74 goes on, switching device 12 immediately turns off and switching device 13 immediately turns on connecting motor terminal 31 at the low voltage rail 49 producing the negative phase 80 of pulse 60 at motor terminal 31. As well known in the art, in reality, to eliminate a short between the positive and negative DC rails 48 and 49, dead time compensation techniques are used to introduce a delay period between the times when one switch turns off and an associated switch turns on. The high frequency voltage pulses average over a given period to produce a low frequency voltage at terminal 31. Ideally, the maximum amplitudes of the positive and negative phase portions 78, 80 of the pulse 60 are plus or minus the DC bus voltage 18.

In reality, however, at high switching frequencies associated with IGBTs and other high speed devices, voltage reflection between the motor 19 and the inverter 9 can increase the magnitude of the terminal 31 voltage to greater than three times the DC voltage 18 when the upper signal 72 has certain characteristics. To substantially eliminate the greater than twice bus voltage phenomenon, the overvoltage compensator 7 receives the upper signal 72 and determines the characteristics of the upper signal 72, compares those characteristics to characteristics known to cause greater than twice overvoltage and, when greater than twice overvoltage is likely, alters the upper signal 72.

Referring to FIG. 5(a), the carrier signal can be divided into carrier periods $T_c$ wherein each carrier period $t_c$ is the time between peak carrier signal values. During any carrier period $t_c$, the upper switch 12 will be on when the upper signal 72 is on and will be off during off periods Toff on either side of the on-time Ton. Near the top and bottom portions of a reference signal 68 where the reference signal 68 becomes substantially horizontal, the off periods Toff on either side of an on-time will be approximately identical. This is particularly true where the carrier frequency is much greater than the frequency of the reference signal as is the case in motor controls.

Thus, during any carrier period $t_c$, when the signal generator 20 compares the carrier and reference signals 67, 68 to generate firing signals, the resulting upper signal 72 has a characteristic on-time $T_{on}$ that is equal to the carrier period $T_c$ less two times an off period Toff.

Referring again to FIG. 1, double pulse greater than twice overvoltage occurs because the discharge or off-time of a signal (i.e. $V_i$ from $\tau_2$ to $\tau_4$) is insufficiently long to allow a motor voltage $V_m$ to reach a steady state zero value before the signal (Vi) is again increased to $V_{DC}$. By reducing the on-time of the upper firing signal during a carrier period, the off-times Toff can be extended until, at some on-time, the off-times reach a critical dwell time $T_\alpha$ at which they are sufficiently long to allow the motor voltage $V_m$ to reach a steady state prior to a change in the signal $V_i$.

For example, referring still to FIG. 1, the bottom curve is similar to the middle curve except that the bottom curve is generated when an inverter voltage $V_i$ has an extended off time (i.e. $\tau_2$ to $\tau_{12}$) on the order of 6–7 μs instead of 4 μs. During the extended off-time, the motor terminal voltage $V'_m$ reaches an approximately zero steady state prior to time $\tau 12$ and prior to the next inverter voltage pulse reaching the terminal. As a result, the overvoltage level is reduced to a maximum value of 2 $V_{DC}$ instead of approximately 3 $V_{DC}$.

Figure 2:
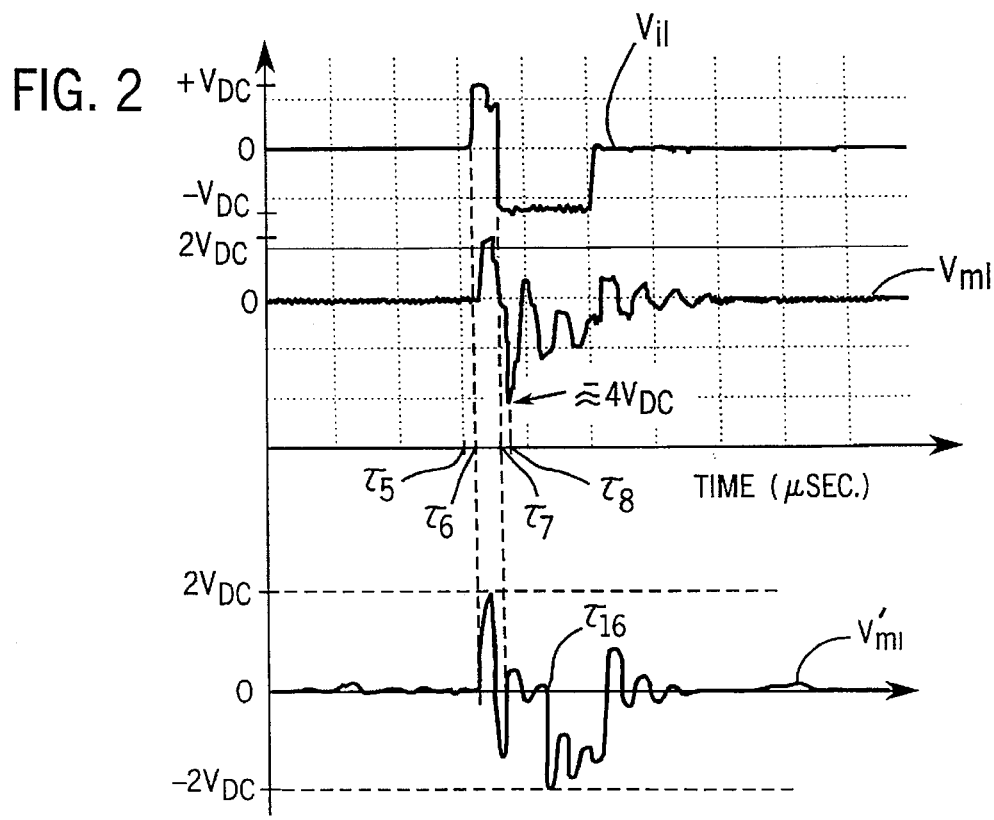
FIG. 2 is similar to FIG. 1.
Figure 3:
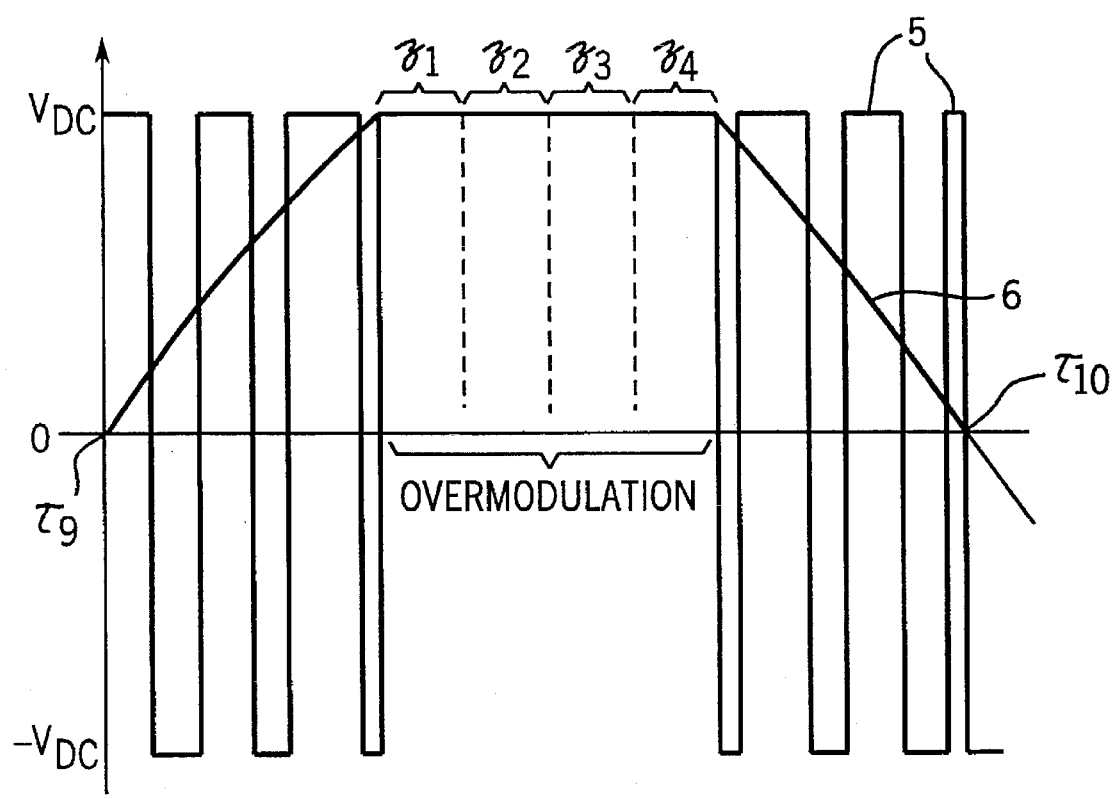
FIG. 3 is a graph illustrating high frequency voltage pulses and a resulting low frequency fundamental terminal voltage.

In a similar fashion, polarity reversal greater than twice overvoltage can be substantially eliminated by altering the duration of switch on-times. Referring to FIGS. 6(a) and 6(b), two upper firing signals $U_x$ and $U_y$ for two different upper switches (e.g. switches 12 and 14 in FIG. 4) can be observed. Firing signal $U_x$ in FIG. 6(a) comes out of, and firing signal $U_y$ goes into, overmodulation at time $\tau 3$. Therefore, in FIG. 6(c), the line-to-line voltage $U_x$–$U_y$ has a polarity reversal at time $\tau_{13}$. Referring also to FIG. 2, polarity reversals like the one at time $\tau_{13}$ in FIG. 6(c) generate greater than twice overvoltage (see time $\tau_8$).

Referring also to FIGS. 6(d) and 6(e), two firing signal $U'_x$ and $U'_y$ compensated according to the present invention can be observed. The compensated firing signals $U'_x$ and $U'_y$ are similar to signals $U_x$ and $U_y$ except that, during a carrier period just prior to coming out of overmodulation pulse $U'_x$ is limited to a maximum allowable on-time $T_{onmax}$ and, during the carrier period just after going into overmodulation signal $U'_y$ is limited to the maximum allowable on-time $T_{onmax}$. Referring also to FIG. 6(f), the resulting line-to-line voltage $U'_x$–$U'_y$ has a period between times $\tau 14$ and $\tau 15$ during which the line-to-line voltage can substantially reach a steady state zero level prior to swinging from the positive to the negative DC rails.

Referring again to FIG. 2, the bottom curve $V'_{m1}$ is like the middle curve except that it represents line-to-line voltage where, upon going into and coming out of overmodulation, associated switching signals are altered as in FIGS. 6(d) and 6(e). As desired, the line-to-line voltage $V'_{m1}$ substantially reaches a steady state zero value by time $\tau 16$, when the line-to-line voltage is forced to the negative DC value.

In the case of a positive phase reference voltage, the critical dwell time $T_\alpha$ is the minimum upper switch off-time $T_{off}$ required for a steady state voltage level to be reached prior to a next firing signal change. In the case of a negative phase reference voltage, the critical dwell time $T_\alpha$ is the minimum upper switch on-time.

The critical dwell time $T_\alpha$ is the time corresponding to the minimum off-time that allows the voltage $V_m$ to reach a substantially zero steady state prior to a recharging second pulse.

The critical dwell time $T_\alpha$ is used to determined, maximum and minimum on-times $T_{onmax}$ and $T_{onmin}$. The maximum on-time $T_{onmax}$ is the carrier period $T_c$ less the critical dwell time $T_\alpha$.

$$T_{onmax} = T_c T_\alpha \qquad \text{Eq. 4}$$

The minimum time $T_{onmin}$ is the critical dwell time $T_\alpha$.

Once the maximum and minimum on-times $T_{onmax}$ and $T_{onmin}$ have been determined, the overvoltage compensator 7 can be programmed to limit switch on-times so that all switch on-times that do not occur during overmodulation are less than or equal to the maximum on-time $T_{onmax}$ and greater than or equal to the minimum on-time $T_{onmin}$. In this way, greater than twice overvoltage due to both double pulsing and polarity reversal are eliminated.

Preferably, the overvoltage compensator 7 is incorporated into a microprocessor (not shown) of a motor controller wherein the microprocessor steps through a software program to alter firing signals as required. However, it should be understood that the present invention is also meant to contemplate other hardware configurations capable of stepping through the inventive methods.

The present invention includes two different methods for substantially limiting greater than twice overvoltage. A first method, referred to herein as the minimum-maximum pulse technique (MMPT), operates to limit the minimum and maximum on and off-times of the upper and lower switches 12, 13. A second method, referred to herein as the pulse elimination technique (PET), like the first method, operates by limiting the minimum and maximum on and off times of the upper and lower switches 12, 13 when overmodulation is not occurring. In addition, the PET technique also eliminates some firing pulses that do not naturally occur during overmodulation.

In each of the inventive methods, during N initial overmodulation carrier periods and during the last N carrier periods of overmodulation in a half-cycle, the switch on-times are limited to the maximum on-time $T_{onmax}$ during reference signal positive phases and to the minimum on-time $T_{onmin}$ during reference signal negative phases to eliminate greater than twice overvoltage due to polarity reversal.

Moreover, in both methods, the compensator 7 tracks firing signal changes during overmodulation periods and, during a reference signal period, symmetrically changes the firing signals during overmodulation periods so as to substantially maintain the fundamental component of the reference signal despite firing signal alterations. Thus, because the upper firing signal is altered during the first N carrier periods of overmodulation, to maintain half-phase symmetry and hence the fundamental component of the resulting voltage, the present invention similarly alters the last N carrier periods of the same overmodulation period.

N Value

N is a number selected by a system designer to ensure that polarity reversal greater than twice overvoltage will not be generated. For example, in a three phase system, ideally reference signals are precisely 60° out of phase so that at the precise instant when one firing signal is going into overmodulation, another signal is coming out. In this case, referring again to FIG. 6(c), the firing signals of the two phases need only by altered during the first carrier period of overmodulation to eliminate polarity reversal.

In reality, however, reference signals are often misaligned. Therefore, while two reference signals might ideally be going into and coming out of overmodulation at the same time, in reality the two occurrences might take place separated by a few degrees. In this case, instead of occurring during an expected carrier period, the polarity reversal could occur during a subsequent carrier period, typically one or two periods later than expected.

To eliminate the possibility of polarity reversal due to reference signals that are not separated by precisely 60°, the present invention limits the maximum and minimum on-times $T_{onmax}$ and $T_{onmin}$ of the firing signals during the first few (i.e. N) carrier periods of overmodulation. A typical N value will be on the order of 1 to 5.

When the peak reference signal value is greater than the peak carrier value during a portion of a positive phase reference signal half-cycle so that overmodulation occurs, the number of firing pulses reduced during the half-cycle is at least 2N (i.e. N at the beginning of overmodulation and N at the end of overmodulation). Similarly, the number of pulses increased during each negative phase reference signal half-cycle where overmodulation occurs is at least 2N. For this reason, the value of N effects the magnitude of output voltage such that, a greater N value results in a reduced output voltage. Therefore, it is desirable to choose the lowest possible value of N that will eliminate polarity reversal so that the required reduction in output voltage is minimized.

While some systems according to the present invention may operate with a single high value for N calculated to ensure elimination of polarity reversal, preferably the compensator 7 is provided with circuitry to alter the value of N as a function of the bus voltage level.

Overmodulation occurs naturally more frequently when the bus voltage drops below a nominal value (e.g. 625 V DC). Thus, when the bus voltage is below the nominal value, the N value must be greater than when the bus voltage is less than the nominal value.

For the purposes of this explanation, it will be assumed that when the bus voltage is greater than 625 V an N value of 1 will eliminate polarity reversal and that when the bus voltage is less than 625 V the N value should be 3 to eliminate polarity reversal.

Figure 10:
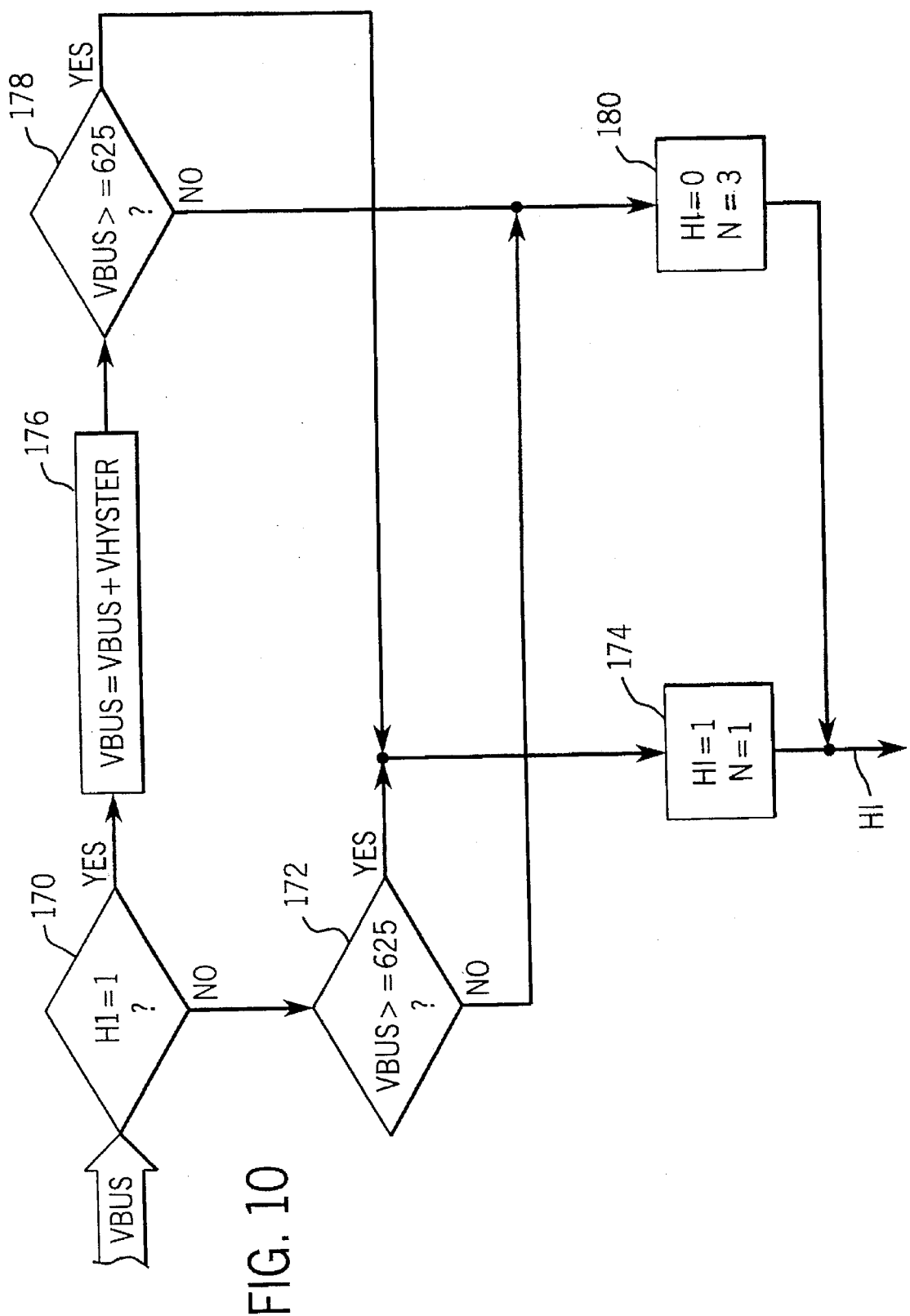
FIG. 10 is a flow chart showing a method used to determine the value of a variable N used in the methods of FIGS. 7 and 9.

According to the present invention the N value can be altered according to the method identified in FIG. 10. In FIG. 10, a flag H1 is initially set to zero. The compensator 7 receives the bus voltage $V_{bus}$ and at block 170, determines if flag H1 is equal to 1. Because flag H1 is zero initially, control passes to decision block 172 where the compensator 7 determines if the bus voltage $V_{bus}$ is equal to or greater than the nominal 625 V value.

Assuming an initial bus voltage of 630 V, the likelihood of polarity reversal is low and control passes to block 174 where flag H1 is set to 1 and N is set to 1.

The next time through the method in FIG. 10, at block 170 flag H1 is equal to 1 and control passes to block 176 where the bus voltage is increased by the 5 V hysteresis voltage $V_{hyster}$ prior to comparison to the nominal 625 V value at block 178. The hysteresis voltage $V_{hyster}$ is added to eliminate rapid fluctuations in the N value when the bus voltage $V_{bus}$ fluctuates around the nominal voltage level 625 V. Assuming that the bus voltage is still 630 V, control again passes to block 174 where H1 is again set to 1 and N is again set to 1.

At some point, if the bus voltage $V_{bus}$ drops below the nominal 625 V value less the hysteresis voltage $V_{hyster}$, flag H1 is set to zero and N to 3. For example, assuming the bus voltage $V_{bus}$ instantaneously drops to 600 V, the next time through the method of FIG. 10, flag H1 is still 1 so control passes to block 176. At block 176, $V_{bus}$ (600 V) is added to $V_{hyster}$ (5 V) for a total of 605 V. At block 178, $V_{bus}$ is less than the nominal 625 V value and control passes to block 180. At block 180 the compensator 7 sets H1 to zero and N to 3.

The next time through the method of FIG. 10, flag H1 is zero and control passes to block 172 for comparison to the nominal 625 V voltage. Assuming the bus voltage $V_{bus}$ is still 600 V, control then passes to block 180 where H1 and N are reset to 0 and 3 respectively. The N value is provided for use by other compensator circuitry.

In this way, an N value is provided which will eliminate polarity reversal problems while still maintaining a relatively high output voltage.

Maximum-Minimum Pulse Technique (MMPT)

The MMPT method will be described in the context of the flow chart shown in FIG. 7 and with reference to FIGS. 1, 4 and 8(a)–8(c). Referring to FIG. 8(a), exemplary carrier and reference signals 67, 68 respectively, are provided. Referring also to FIGS. 4 and 8(b), the signal generator 20, comparing the carrier and reference signals 67, 68, generates upper switch firing signal $U_x$. The upper firing signal $U_x$ is provided to the overvoltage compensator 7.

Figure 7:
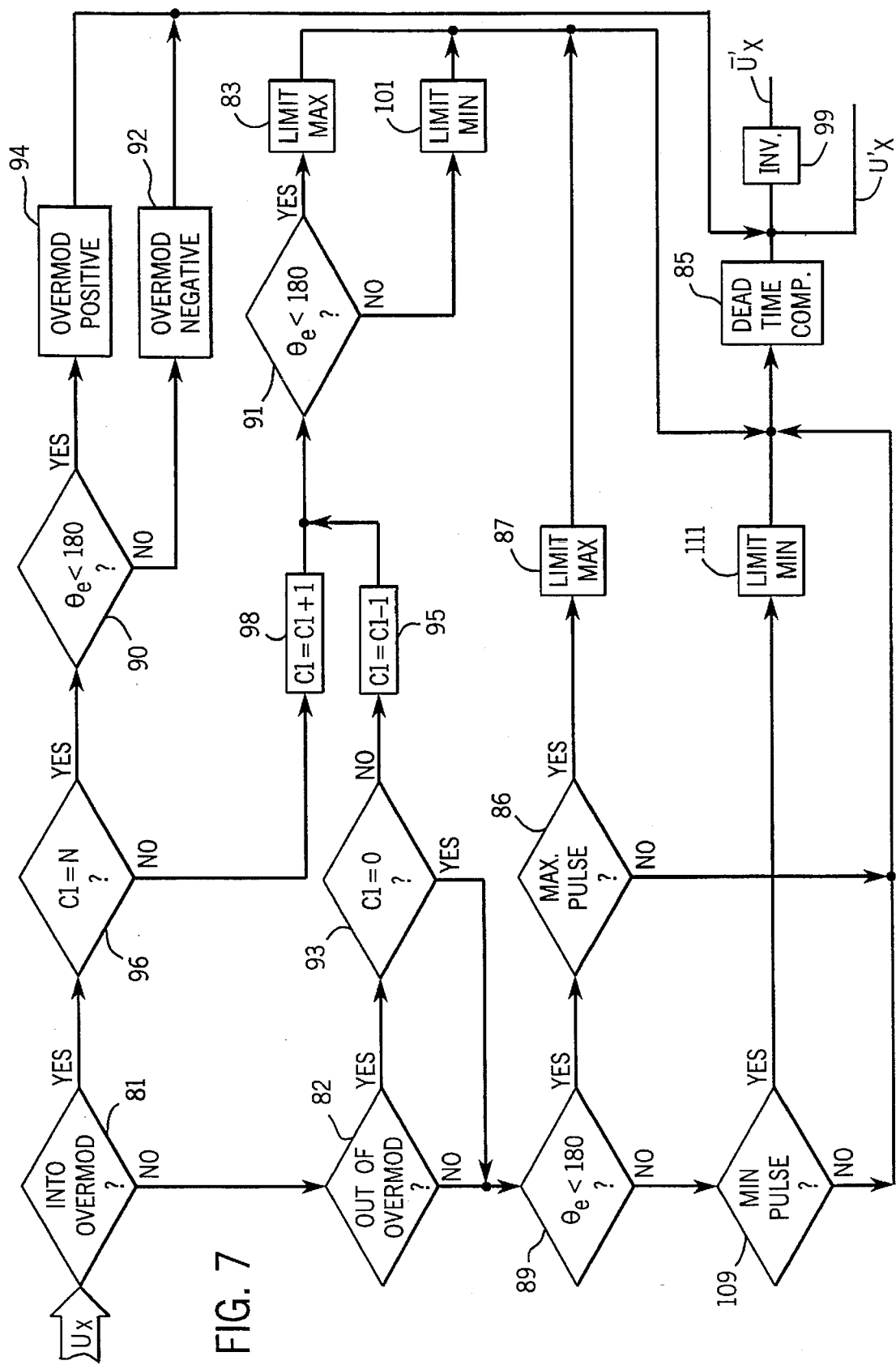
FIG. 7 is a flow chart illustrating a preferred inventive method.
Figure 8C:
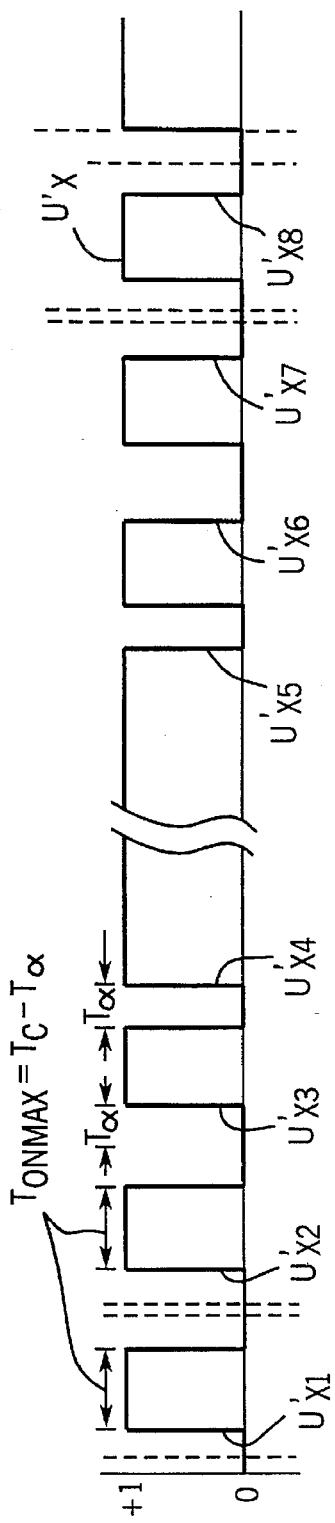
FIG. 8(c) is a graph illustrating firing pulses that have been compensated according to the method shown in FIG. 7.

Referring specifically to FIG. 7, initially a count C1 is set to zero. In accordance with the MMPT method, at decision block 81 the compensator 7 first determines whether or not, during a carrier period, the firing signal $U_x$ is going into overmodulation.

For the purposes of the present invention, a firing signal is said to be "going into" overmodulation during all naturally occurring overmodulation firing pulses in a reference signal half-cycle except the last N firing pulses. During the last N overmodulation firing pulses in a half-cycle the firing signal $U_x$ is said to be "coming out of" overmodulation. In order to simplify this explanation, in the examples which follow, it will be assumed that N is 1.

For the purposes of the present invention any method can be used to determine if a firing signal is "going into" or "coming out of" overmodulation. For example, at block 81 the compensator 7 may determine first if a firing pulse is in overmodulation. Second, where the pulse is in overmodulation the comparator may determine if the firing pulse is within N carrier periods of being out of overmodulation. Where the firing pulse is not within N carrier periods of being out of overmodulation the compensator recognizes that the pulse is "going into" overmodulation at block 81. Continuing, the only pulses passed to block 82 from block 81 are either pulses that are not naturally in overmodulation or pulses that are naturally in overmodulation that occur during the last N carrier periods of overmodulation. Thus, at block 82, if a firing pulse is in overmodulation the pulse is "coming out of" overmodulation. Thus at block 82, the compensator 7 may simply check if the firing pulse is in overmodulation and if so, recognizes that the pulse is "coming out of" overmodulation.

In FIG. 8(a), during the first carrier period $T_{c1}$, the firing pulse is not naturally in overmodulation and therefore, control passes from block 81 through block 82 to block 89.

Reference signals are characterized by a phase angle $\theta_e$ that ranges from 0° to 180° during a positive phase and from 180° to 360° during a negative phase. This means that when $0° < \zeta_e < 180°$, firing signal on-times will be between $$\frac{T_c}{2}$$

and $T_c$ and when $180° < \theta < 360°$, firing signal on-times will be between zero and $$\frac{T_c}{2}.$$

Therefore, when the phase angle $\theta_e$ is greater than 180°, when necessary, the on-time should be limited to the minimum on-time $T_{onmin}$ and when the phase angle $\theta_e$ is less than 180°, if necessary, on-time should be limited to the maximum on-time $T_{onmax}$. There are three separate decision blocks 89, 90, 91 in FIG. 7 where the phase angle $\theta_e$ is compared to 180°.

Continuing with the example shown in FIG. 8(a), at block 89 the compensator 7 determines if the phase angle $\theta_e$ is less than 180°. Referring also to FIGS. 8(b) and 8(c), during the first carrier period $T_{c1}$, the reference signal 68 is positive and therefore the phase angle $\theta_e$ is less than 180°.

Compensator 7 control passes to decision block 86 where the compensator 7 determines if the firing pulse has an on-time greater than or equal to the maximum on-time $T_{onmax}$. In FIG. 8(a), the on-time during the first carrier period $T_{c1}$ is greater than the maximum on-time $T_{onmax}$ and therefore, at block 87 the on-time during $T_{c1}$ is limited to the maximum on-time resulting in altered firing pulse U'$_{x1}$ shown in FIG. 8(c).

Referring to FIGS. 4 and 7, after the pulse is altered, it is provided to delay module 11 which delays each of the firing signals according to a suitable dead time compensation routine at block 85. A preferred delay module and its operation are described in U.S. patent application Ser. No. 08/313,633 filed on Sep. 27, 1994 which is incorporated herein by reference. Where the on-time is less than the maximum on-time T$_{onmax}$, the comparator 7 simply passes the original firing signal U$_x$ to the delay module 11 for dead time compensation. Similarly, all firing pulses, original and altered, that are not naturally in overmodulation, are provided to block 85 for dead time compensation.

After dead time compensation at block 85, the delay module 11 inverts the firing pulse at block 99 to provide upper and lower signals U'$_x$ and $\overline{U}$'$_x$ for controlling the upper and lower switches 12, 13 respectively.

Referring still to FIGS. 7 and 8(a)–8(c), during a second carrier period T$_{c2}$, like the first carrier period T$_{c1}$, the firing pulse is not naturally in overmodulation and therefore could not be going into or coming out of overmodulation. In addition, during T$_{c2}$, the reference signal phase is positive (i.e. θ$_e$<180°) and the firing pulse has an on-time that is greater than the maximum on-time T$_{onmax}$. Therefore, the compensator 7 steps through blocks 81, 82, 89, 86, and 87 to produce a firing pulse U'$_{x2}$ having an on-time equal to the maximum on-time T$_{onmax}$. As above, the altered firing pulse U'$_{x2}$ is provided to the delay module 11 (FIG. 4) for dead time compensation and inversion at blocks 85 and 99, respectively.

Referring still to FIGS. 7 and 8(a)–8(c), during a third carrier period T$_{c3}$, the firing pulse has an on-time equal to the carrier period T$_{c3}$ and is naturally in overmodulation. Because the third carrier period T$_{c3}$ is not one of the last N carrier periods in overmodulation during the immediate phase, the firing pulse is "going into" overmodulation. Thus, after block 81, control passes to block 96 where the compensator 7 checks to see if the count C1 is equal to N.

Referring still to FIG. 7, initially, at the beginning of overmodulation the count C1 is zero and therefore, during the third carrier period T$_{c3}$ the compensator 7 jumps to block 98 and increments the count C1 (i.e. C1=1). Next, at block 91, as at block 89, the compensator 7 determines if the phase angle θ$_e$ is greater than or less than 180°. In FIG. 8(a), the reference signal 68 is positive during the third carrier period T$_{c3}$ and therefore the firing signal pulse during the third carrier period T$_{c3}$ is limited to the maximum on-time T$_{onmax}$ at block 83 producing firing pulse U'$_{x3}$ shown in FIG. 8(c). Pulse U'$_{x3}$ is provided to delay module 11 (FIG. 4) for dead time compensation and inversion.

Continuing, during a fourth carrier period T$_{c4}$, the compensator 7 determines that the firing pulse is in overmodulation and is not within N carrier periods of being out of overmodulation. Thus, the firing signal is "going into" overmodulation. Control again passes to block 96 where the compensator 7 again checks count C1. Because count C1 is now equal to N, control passes to block 90 where, as at blocks 89 and 91, the phase angle θ$_e$ is compared to 180° to determine if the current reference signal is in a positive or negative half-cycle. Here the phase angle θ$_e$ is less than 180° and the compensator 7 causes positive overmodulation by generating a firing pulse having an on-time equal to the carrier period T$_c$ at block 94 producing firing pulse U'$_{x4}$ shown in FIG. 8(c). The overmodulation pulse U'$_{x4}$ is provided directly to the inverter block 99 and not subjected to the dead time compensation block 85.

In this scheme, control passes to block 90 and overmodulation occurs only after the first N firing pulses of naturally occurring overmodulation have been limited to either the maximum on-time T$_{onmax}$ (for positive reference phase) or the minimum on-time T$_{onmin}$ (for negative reference phase).

To maintain positive phase and negative phase symmetry, because the firing signal U$_x$ was modified during the first (i.e. N=1) carrier period T$_{c3}$ in overmodulation, the firing signal U$_x$ must be modified during the last carrier period of overmodulation in the same half-cycle. In the present case, the last carrier period of overmodulation in the half-cycle is period T$_{c6}$.

To this end, referring still to FIGS. 7 and 8(a)–8(c), while in overmodulation, at block 81 the compensator 7 monitors the firing pulse during the Nth next carrier period to determine when the firing signal is no longer "going into" overmodulation. In FIG. 7, the firing signal U$_x$ comes out of overmodulation during the carrier period marked T$_{c7}$.

Therefore, during period T$_{c6}$, at block 81 the compensator 7 examines the firing pulse during period T$_{c7}$ and determines that the firing pulse is no longer in overmodulation during period T$_{c7}$ and therefore is coming out of overmodulation during carrier period T$_{c6}$. Because the firing pulse is coming out of overmodulation during period T$_{c6}$, control passes from block 81 through block 82 to decision block 93.

At decision block 93, the compensator checks if count C1 is equal to zero. Where count C1 is not zero, the last N carrier periods of overmodulation have not yet been limited. During period T$_{c3}$ count C1 was incremented to 1 and therefore, during period T$_{c6}$, count C1 is still 1. Thus, an associated firing pulse must be limited. At block 95 count C1 is decremented (i.e. C1=0) and compensator control passes to block 91. Referring also to FIG. 7, because the reference signal is still in a positive phase during carrier period T$_{c6}$, control passes to block 83 and firing pulse U'$_{x6}$ (See FIG. 8(C)) is produced having the maximum on-time T$_{onmax}$.

During the next carrier period T$_{c7}$, compensator control passes through block 81 to block 82. However, at block 82, because the firing pulse during carrier period T$_{c7}$ is no longer in overmodulation, control passes to block 89. The reference signal is still in the positive half-cycle during period T$_{c7}$ and therefore, (i.e. θ$_e$<180°) at block 89 control passes to block 86 where the compensator 7 determines if the on-time of the firing pulse is greater than the maximum on-time T$_{onmax}$. When appropriate, the firing pulse is limited at block 87 as described above. In FIG. 8(c), the firing pulse is limited to the maximum on-time T$_{onmax}$ resulting in altered signal U'$_{x7}$.

Referring still to FIGS. 7 and 8(a)–8(c), during carrier period T$_{c8}$ like period T$_{c7}$, control passes again through blocks 81, 82, 89, 86, and 87 to limit a corresponding pulse to the maximum on-time producing pulse U'$_{x8}$ shown in FIG. 8(c).

Although not shown in FIG. 8(a), during reference signal negative half-cycles, at block 89 the phase angle θ$_e$ would be greater than 180° and control would pass to block 109. At block 109 the compensator 7 would determine if the firing pulse on-time is less than the minimum on-time T$_{onmin}$. Where the on-time is less than the minimum on-time, the on-time would be limited to the minimum on-time at block 111 prior to dead time compensation and inversion at blocks 85 and 99, respectively. Where the on-time is greater than the minimum on-time T$_{onmin}$ the original firing signal U$_x$ would not be limited and would be compensated for dead time at block 85 prior to inversion at block 99. Similarly, at blocks 90 and 91, where the phase angle is greater than 180°, negative overmodulation and minimum on-time limitations would be imposed, respectively.

The above-described process continues with the compensator 7 checking on-times during every carrier period T$_c$ to determine (1) if the on-time is greater than the maximum on-time or less than the minimum on-time or (2) if the firing signal $U_x$ is going into or coming out of overmodulation, and altering the upper firing signal accordingly. All altered firing pulses are provided to the delay module 11 and then inverted to produce the upper $U_x$ and lower $\overline{U}_x$ firing signals. Overmodulation pulses are provided to the delay module 11 and inverted.

Referring again to FIG. 7, in the case where overmodulation does not occur during a reference signal half-cycle, when a greater than maximum or less than minimum on-time pulse is sensed, control passes through blocks 81, 82, 89, and 86, 87 or 109, 111, depending upon the phase angle $\theta_e$, to limit on-times and eliminate the possibility of greater than twice overvoltage due to double pulsing.

Referring to FIGS. 4 and 7, the compensator 7 works in a similar manner as described above when the reference signal 68 is in the negative phase (not shown) except that, instead of limiting signal on time to the maximum on time, the compensator 7 limits on times to the minimum on time $T_{onmin}$ (block 101). The process should be well understood in view of the process described above.

In this manner, greater than twice overvoltage due to both double pulsing and polarity reversal can be substantially eliminated. In addition, by altering the firing pulses $U_x$ in an identical manner at the end of overmodulation as at the beginning, the fundamental component of resulting motor voltage can be substantially maintained despite altered pulses.

One problem with the MMPT method is that it can substantially reduce inverter output voltage supplied to a load. For example, comparing the waveforms in FIGS. 8(b) and 8(c), each time the on-time of the firing signal $U_x$ is reduced to the maximum on-time $T_{onmax}$, in FIG. 8(c), the average output voltage is reduced. Where the carrier frequency is increased, the number of on-times limited during a reference signal cycle is increased thus causing noticeable output loss. The PET method substantially eliminates overvoltage yet maintains the output voltage at a level substantially equal to the level that would be produced by the original reference signal.

Pulse Elimination Technique (PET)

The PET method will be described in the context of the flow chart shown in FIG. 9 and with reference to FIGS. 1, 8(a), 8(b) and 8(d). To simplify this explanation, decision and process blocks in FIG. 9 that are identical or substantially identical to decision and process blocks in FIG. 7 are identified by the same number except that in FIG. 9 the reference number is followed by a "'".

Figure 8D:
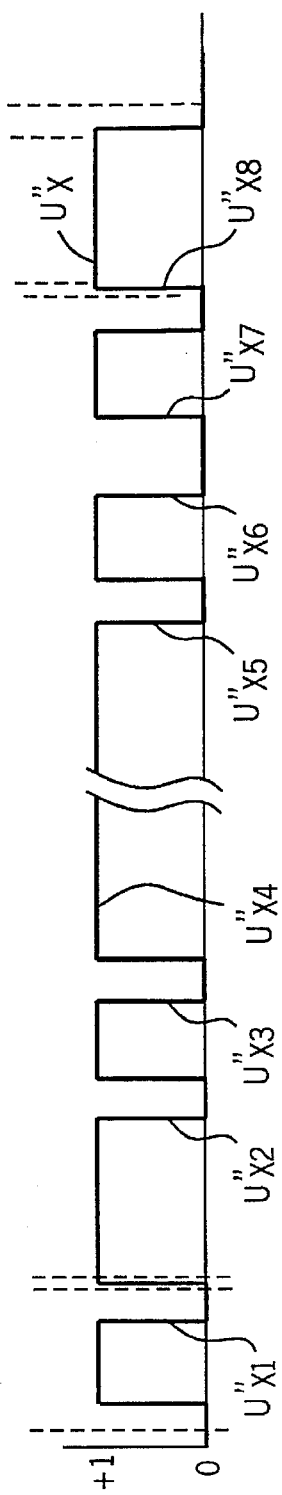
FIG. 8(d) is a graph illustrating firing pulses that have been compensated according to a second preferred method.
Figure 9:
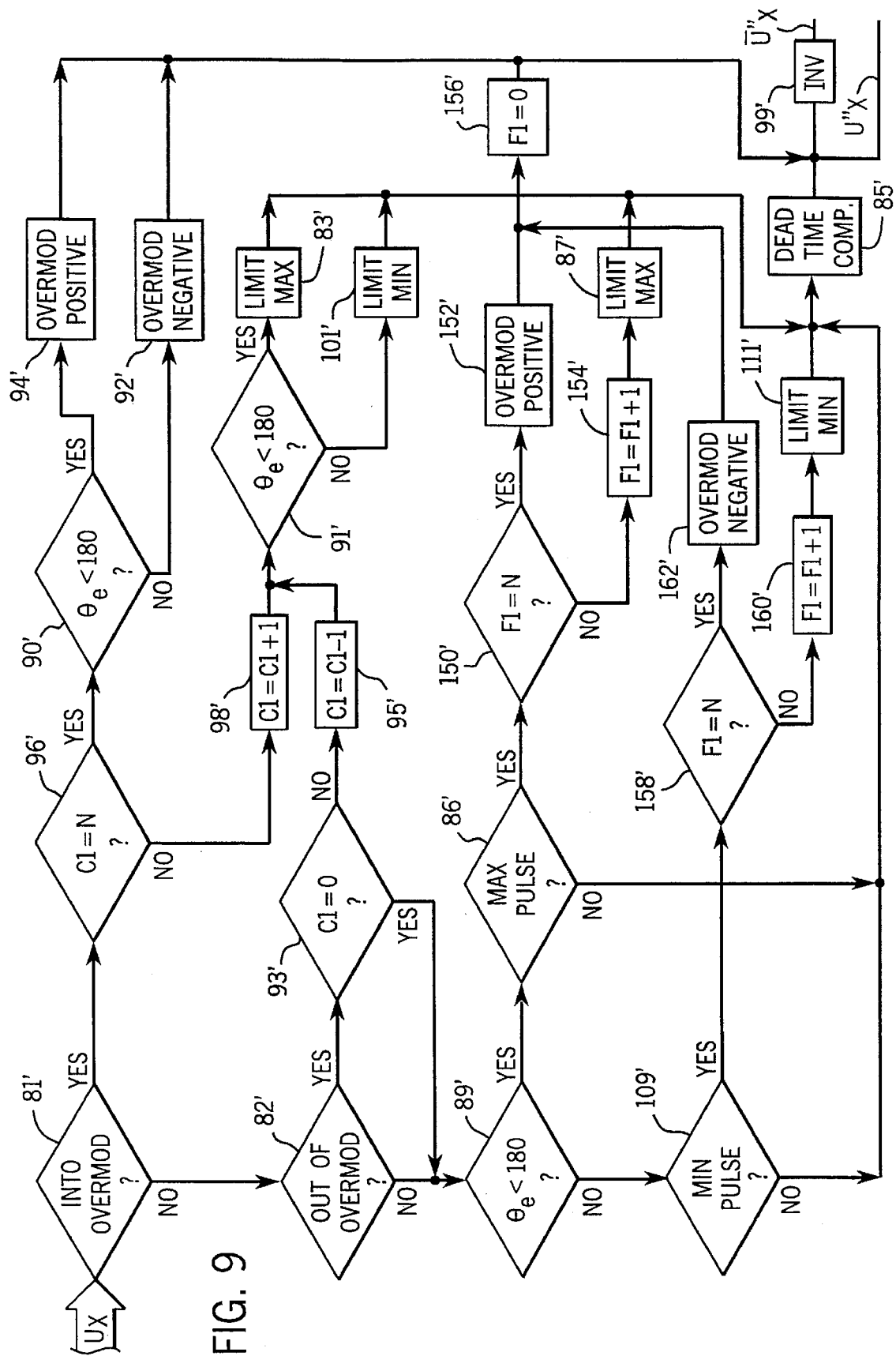
FIG. 9 is a flow chart showing the method used to provide the compensated firing pulses of FIG. 8(d)

Referring specifically to FIG. 9, some parts of the PET method are identical to the MMPT method described above. In particular, the PET method, like the MMPT method identifies carrier periods during which the firing signal $U_x$ is going into overmodulation and carrier periods during which the firing signal $U_x$ is coming out of overmodulation in each half-cycle and limits the on-times of the upper firing signal to the maximum or minimum on-times $T_{onmax}$, $T_{onmin}$ in to eliminate greater than twice over voltage due to polarity reversal. In this regard, the top half of FIG. 9, including blocks 81', 96', 90', 94', 92', 98', 91', 83', 82', 93', 95', and 101' operate in the same manner described above when the firing signal is in overmodulation. The similarity between PET and MMPT methods during overmodulation is reflected in the altered pulses during overmodulation shown in FIGS. 8(c) and 8(d). Thus, during periods of naturally occurring overmodulation (i.e. carrier periods $T_{c3}$ to $T_{c6}$), altered pulses $U''_{x3}-U''_{x6}$ are identical to altered pulses $U''_{x3}-U''_{x6}$.

However, according to the PET method, instead of only limiting on-times to the maximum and minimum turn-on times $T_{onmax}$ and $T_{onmin}$, some upper firing signal turn-off times Toff (See FIG. 5(b)) are entirely eliminated when a firing signal turn-on time is greater than the maximum on-time $T_{onmax}$ and some firing signal turn on-times are entirely eliminated when the turn-on time is less than the minimum turn on-time $T_{onmin}$. In this way, the output voltage is maintained at a level equal to the level that would be produced by the original reference signal.

Referring to FIG. 9, in accordance with the PET method, initially first and second counts C1 and F1 are set to zero. As above count C1 is used to ensure that the first and last N firing pulses in each overmodulation period are limited to either the maximum or minimum on-times $T_{onmax}$ OR $T_{onmin}$. The second count F1 is used to eliminate some firing pulses that do not occur during overmodulation but still have on-times that are either greater than the maximum or less than the minimum on-times $T_{onmax}$, $T_{onmin}$, respectively. At decision block 81' the compensator 7 first determines whether or not, during a carrier period, the firing signal $U_x$ is going into overmodulation. Where the firing signal $U_x$ is going into overmodulation, control passes to block 96'.

In FIG. 8(a), during the first carrier period $T_{c1}$, the firing signal $U_x$ is not going into overmodulation and therefore cannot be "going into" or "coming out of" overmodulation as those terms are defined above. Thus during the first carrier period $T_{c1}$, control passes through blocks 81' and 82' to block 89'. At decision block 89' the controller 7 determines if the reference signal is in the positive or negative half-cycle by comparing the phase angel $\theta_e$ to 180°. During the first carrier period $T_c$ the reference signal 68 is in the positive half-cycle (i.e. $\theta_e < 180°$), and therefore control passes to block 86' where the firing pulse on-time is compared to the maximum on-time $T_{onmax}$.

Referring still to FIG. 8(a), during the first carrier period $T_{c1}$ the firing pulse on-time is greater than the maximum on-time $T_{onmax}$ and therefore control passes to block 150'.

At block 150' the second count F1 is checked to determine if it is equal to N. If count F1 is equal to N, control passes to block 152' where positive overmodulation commences which in effect eliminates firing signal off-time during the carrier period. Assuming that the firing pulse during the carrier period proceeding the first carrier period $T_{c1}$ had an on-time less than the maximum on-time $T_{onmax}$, at this point F1 is still zero. Thus, when the firing signal $U_x$ during the first carrier period $T_{c1}$ is examined, control passes from block 150' to block 154' where the count F1 is incremented (i.e. F1=1). Then the firing pulse on-time is limited to the maximum on-time $T_{onmax}$ at block 87' producing altered firing pulse $U''_{x1}$ seen in FIG. 8(d). Blocks 85' and 99' operate in the same manner as explained above in reference to the MMPT method.

Referring still to FIGS. 4, 8(a), 8(b), 8(d), and 9, during the second carrier period $T_{c2}$, as during the first carrier period $T_{c1}$, the firing pulse is not in overmodulation and therefore cannot be "going into" or "coming out of" overmodulation. In addition, during the second carrier period $T_{c2}$ the reference signal is in the positive half-cycle and the firing pulse has an on-time greater than the maximum on-time $T_{onmax}$. Therefore, during the second carrier period $T_{c2}$, compensator control passes through blocks 81' 82', 89' and 86' to process block 150'.

At block 150' the compensator 7 again compares the second count F1 to N. Here because F1 was incremented during the previous carrier period $T_{c3}$, F1 is now 1 and equal to N. Thus, control passes to block 152' where the firing pulse is altered so that it is in positive overmodulation during the second carrier period $T_{c2}$. In other words, during the second carrier period $T_{c2}$ the firing pulse off-time is eliminated and its on-time is made equal to the carrier period generating the firing pulse $U''_{x2}$ as illustrated in FIG. 8(d).

Referring to FIGS. 8(c) and 8(d), comparing firing pulse $U''_{x2}$ which was altered according to the PET method to firing pulse $U'_{x2}$ which was altered according to the MMPT method, it is clear that the PET altered signal $U''_{x2}$ is more similar to the original firing signal (see FIG. 8(b)) than is the MMPT altered pulse $U'_{x2}$. In addition, because the PET altered pulse $U''_{x2}$ has a longer on-time than the MMPT altered pulse $U'_{x2}$, the PET altered pulse produces a higher output voltage.

Continuing with the above example, after block 152', the compensator 7 resets the second count F1 to zero at block 156' prior to passing the altered firing pulse $U''_{x2}$ to the inverter block 99'.

During the next carrier period, if the firing pulse were not fully into overmodulation, the compensator 7 would step through blocks 81', 82', 89', 86' to 150'. Because F1 was reset to zero at block 156', control would pass through blocks 154' and 87' limiting the next pulse to the maximum on-time $T_{onmax}$. Thus, where N is 1, every other firing pulse that has an on-time greater than the maximum on time $T_{onmax}$ and is not in overmodulation is altered so that it is in positive overmodulation. Similarly, where N is 1 every firing pulse that has an on-time less than the minimum on-time Tonmin and is not in overmodulation is altered so that it is in negative overmodulation. Parenthetically, if N were 2, every third pulse would be altered so that it is in overmodulation.

Referring again to FIGS. 8(a) and 8(b), during the third carrier period $T_{c3}$, the firing pulse actually is completely in overmodulation and therefore, the compensator 7 moves from decision block 81' to decision block 96' where the compensator 7 determines if the first count C1 is equal to N. In this case, because the third carrier period $T_{c3}$ is the first carrier period during the positive phase in which the firing signal $U_x$ is fully in overmodulation, at this point count C1 is equal to zero and therefore, the compensator 7 passes from decision block 96' to process block 98' and increments count C1 before passing to decision block 91'.

At decision block 91', the compensator 7 determines whether or not the reference signal 68 is in the positive or negative phase. Referring still to FIG. 8(a), during the third carrier period $T_{c3}$, the reference signal 68 is in the positive phase and therefore, at process block 83', the compensator 7 limits the firing pulse on-time to the maximum on-time $T_{onmax}$ and generates the altered firing pulse $U''_{x3}$ seen in FIG. 8(d). Pulse $U''_{x3}$ is passed to blocks 85' and 99' for dead time compensation and inversion, respectively.

Referring again to FIG. 8(a), during the fourth carrier period $T_{c4}$, because the firing pulse is "going into" overmodulation control passes from block 81' to decision block 96'. Because count C1 is equal to N (i.e. C1=1), control passes to block 90'.

At block 90' the compensator 7 determines if the reference signal is in the positive or the negative phase. In the present example, during the fourth carrier period $T_{c4}$, the reference signal 68 is in the positive phase and therefore, control passes from block 90' to block 94' where the firing pulse is altered to provide a positive overmodulation pulse.

Referring still to FIGS. 8(a), 8(b), and 8(d), during what is labeled carrier period $T_{c6}$, the compensator 7 recognizes that one carrier period later, during carrier period $T_{c7}$, the firing signal $U_x$ is out of overmodulation. Therefore, during carrier period $T_{c6}$, the compensator 7 moves through blocks 81' and 82' to block 93'. At decision block 93' the compensator 7 determines whether or not the first count C1 is equal to zero. In this case, the count C1 is 1 and therefore, control passes to process block 95' where the count C1 is decremented prior to control moving to decision block 91'. Again, at decision block 91', the compensator 7 determines if the reference signal is in the positive or negative phase. Referring specifically to FIG. 8(a), during carrier period $T_{c6}$, the reference signal 68 is in the positive phase and therefore, at process block 83' the compensator 7 alters the firing pulse to provided altered firing pulse $U''_{x5}$ as seen in FIG. 8(d) having the maximum on-time $T_{onmax}$.

During carrier period $T_{c7}$, the compensator 7 steps through blocks 81', and 82', recognizes that the firing pulse during carrier period $T_{c7}$ is not naturally in overmodulation, and steps to block 89'.

Again, the compensator 7 determines if the reference signal 68 is in the positive or negative phase at block 89'. Referring still to FIG. 8(a), during carrier period $T_{c7}$ the reference signal is in the positive phase and therefore control passes to block 86' where the firing signal $U_x$ on-time is compared to the maximum on-time $T_{onmax}$. In this example, the firing pulse on-time is greater than the maximum on-time $T_{onmax}$ and therefore compensator 7 control moves to block 150' where second count F1 is compared to N. Here F1 is initially zero (as set earlier during the second carrier period $T_c2$). Thus, control passes to block 154' where count F1 is incremented (i.e. F1=1) and the firing pulse on-time is limited to the maximum on-time $T_{onmax}$ producing altered firing pulse $U''_{x7}$ seen in FIG. 8(d).

Continuing, during carrier period $T_{c8}$, control steps through blocks 81', 82', 89' and 86' and reaches block 150'. Now, at block 150', count F1 is again compared to N. At this point, F1 is equal to N and control passes to block 152' where the firing pulse is forced into positive overmodulation thus eliminating off-times during carrier period $T_{c8}$ and generating firing pulse $U''_{x8}$ seen in FIG. 8(d). Thereafter, count F1 is again set to zero at block 156'.

Referring to FIG. 9, the compensator 7 works in a similar manner as described above when the reference signal 68 is in the negative phase (not shown) except that, instead of forcing positive overmodulation and limiting signal on-times to the maximum on-time, the compensator 7 forces negative overmodulation (blocks 92' and 162') and limits on-times to the minimum on-time $T_{onmin}$ (blocks 101' and 111'). This process should be well understood in view of the process described above.

Referring to FIGS. 8(c) and 8(d), with both of the inventive methods (i.e. MMPT and PET) the altered firing pulses associated with each reference signal are altered in approximately symmetrical ways within each reference signal half-cycle.

It should be understood that the methods and apparatus described above are only exemplary and do not limit the scope of the invention, and that various modifications could be made by those skilled in the art that could fall under the scope of the invention. For example, while the invention is described in the context of a system for altering an upper firing signal, the system could be used to alter other system signals (e.g. lower firing signal, high frequency pulses, . . . ) in a similar fashion. The important aspect of the present invention is that maximum and minimum on-times are controlled.

Moreover, while the critical dwell time $T_\alpha$ has been described above, clearly other dwell times could be determined that might be of a shorter duration that could suffice in different circumstances. For example, where line characteristics reduce voltage reflection, a shorter dwell time may suffice. In addition, where a previous on-time has been limited, it may not be necessary to limit current on-time as the combined off-time between pulses may be sufficient to allow a steady state voltage to be reached.

To apprise the public of the scope of this invention we make the following claims:

We claim:

1. A method to be used with a motor controller generating firing pulses to control an inverter, the inverter providing exciting voltage to a motor corresponding to the firing pulses, the voltage having a maximum intended amplitude, the method for substantially eliminating exciting voltage greater than twice the maximum intended amplitude by modifying the firing pulses to provide modified firing pulses, the method comprising the steps of:

(a) identifying firing pulse characteristics;

(b) comparing the firing pulse characteristics to an overvoltage characteristic set known to cause greater than twice overvoltage;

(c) where the firing pulse characteristics match the overvoltage characteristic set, generating a modified firing pulse having modified characteristics that do not cause greater than twice overvoltage; and (d) modifying subsequent firing pulses to compensate for the effect of the modified firing pulse.

2. The method of claim 1 wherein the controller includes a comparator that compares a reference signal to a carrier signal to provide the initial firing pulses, one firing pulse provided during each carrier period, each firing pulse characterized by an on-time having a duration that is between zero and the length of the carrier period, firing pulses in overmodulation when their on-times are either zero or the length of the carrier period, the overvoltage characteristics include a maximum and a minimum on-time, the reference signal having alternating positive and negative phases, the step of generating including, during positive phases of the reference signal, limiting the on-times of the firing pulses during the first N carrier periods of overmodulation to the maximum on-time and, during negative phases of the reference signal, limiting the on-times of the firing pulses during the first N carrier periods of overmodulation to the minimum on-time.

3. The method of claim 2 wherein N is less than 5.

4. The method of claim 3 wherein N is 1.

5. The method of claim 2 wherein the step of identifying includes, where overmodulation occurs, identifying the last N carrier periods of an overmodulation period and, the step of modifying other signals includes the steps of, limiting the firing pulses during the last N carrier periods of the overmodulation period to the maximum on-time when the reference signal is in the positive phase and to the minimum on-time when the reference signal is in the negative phase.

6. The method of claim 5 wherein, the step of identifying includes the step of determining the on-times of each firing pulse that does not occur during an overmodulation period, and the step of comparing includes the step of comparing each of the firing pulse on-times to the maximum and minimum on-times.

7. The method of claim 6 wherein, where the reference signal phase is positive, the step of generating includes the step of limiting firing pulse on-times during carrier periods immediately preceding an overmodulation period and limiting firing pulse on-times during carrier periods immediately following an overmodulation period to the maximum on-time, and where the reference signal phase is negative, the step of generating includes the step of limiting the firing pulse on-times during carrier periods immediately preceding an overmodulation period and limiting the firing pulse on-times during carrier periods immediately following an overmodulation period to the minimum on-time.

8. The method of claim 6 wherein, when the reference signal phase is positive, the step of generating includes the step of increasing some of the firing pulse on-times that are greater than the maximum on-time during carrier periods preceding and following an overmodulation period to the carrier period duration, and when the reference signal phase is negative, the step of generating includes the step of eliminating some of the firing pulse on-times that are less than the minimum on-time during carrier periods preceding and following an overmodulation period so that the on-times have zero duration.

9. The method of claim 2 wherein a voltage bus provides a DC voltage at a voltage level to the inverter and the method further includes the step of altering the value of N as a function of the voltage level.

10. The method of claim 9 wherein the controller provides a nominal voltage value and the method further includes the steps of:

comparing the voltage level to the nominal voltage value; and when the nominal voltage level is less than the voltage value, setting N equal to a first value; and when the nominal value level is greater than the voltage value, setting N equal to a second value that is less than the first value.

11. The method of claim 10 wherein the first value is 3 and the second value is 1.

12. An apparatus to be used with a motor controller generating firing pulses to control an inverter, the inverter providing exciting voltage to a motor corresponding to the firing pulses, the voltage having a maximum intended amplitude, the apparatus for substantially eliminating exciting voltage greater than twice the maximum intended amplitude by modifying the firing pulses to provide modified firing pulses, the apparatus comprising:

(a) means for identifying firing pulse characteristics;

(b) means for comparing the firing pulse characteristics to an overvoltage characteristic set known to cause greater than twice overvoltage;

(c) where the firing pulse characteristics match the overvoltage characteristic set, means for generating a modified firing pulse having modified characteristics that do not cause greater than twice overvoltage; and (d) means for modifying subsequent firing pulses to compensate for the effect of the modified firing pulse.

13. The apparatus of claim 12 wherein the controller includes a comparator that compares a reference signal to a carrier signal to provide the initial firing pulses, one firing pulse provided during each carrier period, each firing pulse characterized by an on-time having a duration that is between zero and the length of the carrier period, firing pulses in overmodulation when their on-times are either zero or the length of the carrier period, the overvoltage characteristics include a maximum and a minimum on-time, the reference signal having alternating positive and negative phases, the means for generating including, during positive phases of the reference signal, means for limiting the on-times of the firing pulses during the first N carrier periods of overmodulation to the maximum on-time and, during negative phases of the reference signal, means for limiting the on-times of the firing pulses during the first N carrier periods of overmodulation to the minimum on-time.

14. The apparatus of claim 13 wherein N is less than 5.

15. The apparatus of claim 14 wherein N is 1.

16. The apparatus of claim 10 wherein the means for identifying includes, where overmodulation occurs, means for identifying the last N carrier periods of an overmodulation period and, the means for modifying other signals includes means for limiting the firing pulses during the last N carrier periods of the overmodulation period to the maximum on-time when the reference signal is in the positive phase and to the minimum on-time when the reference signal is in the negative phase.

17. The apparatus of claim 16 wherein, the means for identifying firing pulse characteristics includes means for determining the on-times of each firing pulse that does not occur during an overmodulation period and the means for comparing includes means for comparing each of the firing pulse on-times to the maximum and minimum on-times.

18. The apparatus of claim 17 wherein, when the reference signal phase is positive, the means for generating includes means for limiting firing pulse on-times that are greater than the maximum on-time during carrier periods immediately preceding and following an overmodulation period to the maximum on-time, and where the reference signal phase is negative, the means for generating includes means for limiting a number of firing pulse on-times that are less than the minimum on-time during carrier periods immediately preceding and following an overmodulation period to the minimum on-time.

19. The apparatus of claim 17 wherein, when the reference signal phase is positive, the means for generating includes means for increasing some of the firing pulse on-times that are greater than the maximum on-time during carrier periods preceding and following an overmodulation period to the carrier period duration, and when the reference signal phase is negative, the means for generating includes means for eliminating some of the firing pulse on-times during carrier periods that are less than the minimum on-time preceding and following an overmodulation period so that the on-times have zero duration.

20. The apparatus of claim 13 wherein a voltage bus provides a DC voltage at a voltage level to the inverter and the apparatus further includes means for altering the value N as a function of the voltage level.

21. The apparatus of claim 20 wherein the controller provides a nominal voltage value and the apparatus further includes:

means for comparing the voltage level to the nominal voltage value; and when the nominal voltage level is less than the voltage value, means for setting N equal to a first value; and when the nominal value level is greater than the voltage value, means for setting N equal to a second value that is less than the first value.

22. The apparatus of claim 21 wherein the first value is 3 and the second value is 1.

* * * * *